United States Patent
Cohen et al.

(10) Patent No.: US 10,957,034 B2
(45) Date of Patent: Mar. 23, 2021

(54) METHOD OF EXAMINATION OF A SPECIMEN AND SYSTEM THEREOF

(71) Applicant: APPLIED MATERIALS ISRAEL LTD., Rehovot (IL)

(72) Inventors: Elad Cohen, Beer Sheva (IL); Shahar Arad, Holon (IL)

(73) Assignee: APPLIED MATERIALS ISRAEL LTD., Rehovot (IL)

( * ) Notice: Subject to any disclaimer, the term of this patent is extended or adjusted under 35 U.S.C. 154(b) by 215 days.

(21) Appl. No.: 16/250,832

(22) Filed: Jan. 17, 2019

(65) Prior Publication Data
US 2020/0234417 A1 Jul. 23, 2020

(51) Int. Cl.
*G06T 7/00* (2017.01)
*G06T 5/00* (2006.01)
*G06T 5/50* (2006.01)

(52) U.S. Cl.
CPC .............. *G06T 7/001* (2013.01); *G06T 5/002* (2013.01); *G06T 5/50* (2013.01); *G06T 2207/20212* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 7,558,419 B1* | 7/2009 | Ye | G03F 1/84 382/144 |
| 2006/0193507 A1* | 8/2006 | Sali | G01N 21/95607 382/145 |
| 2007/0133860 A1* | 6/2007 | Lin | G06T 7/001 382/149 |
| 2007/0288219 A1* | 12/2007 | Zafar | G06T 7/0008 703/14 |
| 2008/0250384 A1* | 10/2008 | Duffy | G03F 7/7065 716/55 |
| 2017/0169552 A1 | 6/2017 | Brauer et al. | |
| 2018/0293721 A1* | 10/2018 | Gupta | G05B 19/41875 |
| 2020/0226744 A1* | 7/2020 | Cohen | G06T 7/0004 |

* cited by examiner

*Primary Examiner* — Mohammed Rachedine
(74) *Attorney, Agent, or Firm* — Lowenstein Sandler LLP

(57) ABSTRACT

There are provided a system and method of examination on a specimen, the method comprising: obtaining an inspection image of a die and generating a defect map using one or more reference images; selecting a plurality of defect candidates from the defect map; and generating for each defect candidate, a respective modified inspection image patch, comprising: extracting an image patch surrounding the defect candidate respectively from the inspection image and each reference image; and modifying the inspection image patch, comprising: estimating noise representative of intensity variations on the inspection image patch, the noise including a first type of noise representative of a polynomial relation between the inspection and reference image patches, and a second type of noise representative of a spatial anomaly in the inspection image patch, and removing at least one of the first and second types of noise from the inspection image patch based on the estimated noise.

20 Claims, 9 Drawing Sheets

METHOD OF EXAMINATION OF A SPECIMEN AND SYSTEM THEREOF

TECHNICAL FIELD

The presently disclosed subject matter relates, in general, to the field of examination of a specimen, and more specifically, to methods and systems of defect detection on a specimen.

BACKGROUND

Current demands for high density and performance associated with ultra large scale integration of fabricated devices require submicron features, increased transistor and circuit speeds, and improved reliability. As semiconductor processes progress, pattern dimensions such as line width, and other types of critical dimensions, are continuously shrunken. This is also referred to as the design rule. Such demands require formation of device features with high precision and uniformity, which, in turn, necessitates monitoring of the fabrication process, including frequent and detailed inspections of the devices while they are still in the form of semiconductor wafers, including both finished devices and/or unfinished devices.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

Unless specifically stated otherwise, the term "examination" used in this specification should be expansively construed to cover any kind of detection and/or classification of defects in an object. Examination is provided by using, e.g., non-destructive examination tools during or after manufacture of the object to be examined. By way of non-limiting example, the examination process can include scanning (in a single or in multiple scans), sampling, reviewing, measuring, classifying and/or other operations provided with regard to the object or parts thereof, using one or more examination tools. Likewise, examination can be provided prior to manufacture of the object to be examined and can include, for example, generating an examination recipe(s). It is noted that, unless specifically stated otherwise, the term "examination" or its derivatives used in this specification are not limited with respect to the size of the inspected area(s), to the speed or resolution of the scanning, or to the type of examination tools. A variety of non-destructive examination tools includes, by way of non-limiting example, optical tools, scanning electron microscopes, atomic force microscopes, etc.

The examination process can include a plurality of examination steps. During the manufacturing process, the examination steps can be performed a multiplicity of times, for example after the manufacturing or processing of certain layers, or the like. Additionally or alternatively, each examination step can be repeated multiple times, for example for different wafer locations or for the same wafer locations with different examination settings.

By way of non-limiting example, run-time examination can employ a two-step procedure, e.g. inspection of a specimen followed by review of sampled defects. During the inspection step, the surface of a specimen or a part thereof (e.g. areas of interest, hot spots, etc.) is typically scanned at relatively high-speed and/or low-resolution. The captured inspection image is analyzed in order to detect defects and obtain locations and other inspection attributes thereof. At the review step, the images of at least some of the defects detected during the inspection phase are, typically, captured at relatively low speed and/or high-resolution, thereby enabling classification and, optionally, other analyses of at least some of the defects. In some cases both phases can be implemented by the same inspection tool, and, in some other cases, these two phases are implemented by different inspection tools.

Examination generally involves generating some output (e.g., images, signals, etc.) for a wafer by directing light or electrons to the wafer and detecting the light or electrons from the wafer. Once the output has been generated, defect detection is typically performed by applying a defect detection method and/or algorithm to the output. Most often, the goal of examination is to provide high sensitivity to defects of interest, while suppressing detection of nuisance and noise on the wafer.

There is a need in the art for improving the sensitivity of defect detection.

GENERAL DESCRIPTION

In accordance with certain aspects of the presently disclosed subject matter, there is provided a computerized system of examination of a specimen, the system comprising: an examination tool configured to capture an inspection image of a die of the specimen and generate a defect map indicative of defect candidate distribution on the inspection image using one or more reference images; and a processing unit operatively connected to the examination tool, the processing unit comprising a memory and a processor operatively coupled thereto, the processing unit configured to: select, in accordance with a predefined criterion, a plurality of defect candidates from the defect map; and generate, for each of the plurality of defect candidates, a respective modified inspection image patch, giving rise to a plurality of modified inspection image patches corresponding to the plurality of defect candidates, wherein the generating comprises, for a given defect candidate of the plurality of defect candidates: extracting an image patch surrounding a location of the given defect candidate respectively from the inspection image and each of the one or more reference images, giving rise to a set of image patches including an inspection image patch and one or more reference image patches corresponding to the given defect candidate; and modifying the inspection image patch to obtain a modified inspection image patch, comprising: estimating noise representative of intensity variations on the inspection image patch using the set of image patches, the noise including a first type of noise representative of a polynomial relation between pixel values of the inspection image patch and corresponding pixel values in at least some of the reference image patches, and a second type of noise representative of presence of a spatial anomaly in the inspection image patch with respect to at least some of the reference image patches, and removing at least one of the first and second types of noise from the inspection image patch based on the estimated noise; wherein the modified inspection image patches and/or the estimated noise are usable for further examination of the specimen.

In addition to the above features, the system according to this aspect of the presently disclosed subject matter can comprise one or more of features (i) to (ix) listed below, in any desired combination or permutation which is technically possible:

(i). The processing unit can be further configured to perform defect detection on the specimen using the plurality of modified inspection image patches with respect to the one or more reference image patches, giving rise to an updated defect map.

(ii). The processing unit can be further configured to perform defect candidate clusterization using a set of attributes characterizing the defect candidates, the set of attributes comprising at least one or more attributes of the estimated noise.

(iii). The estimating can comprise: estimating spatial size of the spatial anomaly and one or more coefficients of the polynomial relation with respect to each of the one or more reference image patches, giving rise to one or more estimations of the spatial size and the coefficients corresponding to the one or more reference image patches, and performing the removing based on at least some of the one or more estimations.

(iv). The estimating can further comprise: combining the one or more estimations of the spatial size to generate a composite estimation of the spatial anomaly, comparing the composite estimation with a known defect model to determine whether the composite estimation represents presence of the known defect model on the inspection image patch, and wherein the removing comprises in response to determination of presence of the known defect model, removing the second type of noise from the inspection image patch based on the composite estimation.

(v). The estimating can further comprise combining the one or more estimations of the coefficients to generate a composite estimation of the polynomial relation, and wherein the removing comprises removing the first type of noise from the inspection image patch based on the composite estimation.

(vi). The estimating spatial size can comprise, for a given reference image patch of the one or more reference image patches:
  providing different estimations of the spatial size each including length, width and amplitude of the spatial anomaly, and different defect estimations of amplitude of a potential defect co-positioned with the spatial anomaly;
  calculating, using a plurality of combinations between the different estimations of the spatial size and the different defect estimations, a plurality of estimated errors each indicative of a residual difference between an expected modified inspection image patch and the given reference image patch, wherein the expected modified image patch is obtainable by modifying the inspection image patch using a respective combination; and
  selecting a combination among the a plurality of combinations that provides a minimum estimated error among the plurality of estimated errors, wherein the selected combination includes a selected estimation of the spatial size.

(vii). The one or more coefficients can comprise gain and offset of the polynomial relation.

(viii). The one or more attributes of the estimated noise can comprise one or more estimations of the spatial size and the coefficients.

(ix). The examination tool can be an optical inspection tool.

In accordance with another aspect of the presently disclosed subject matter, there is provided a computerized method of examination of a specimen, the method comprising: capturing, by an examination tool, an inspection image of a die of the specimen and generating a defect map indicative of defect candidate distribution on the inspection image using one or more reference images; selecting, by a processing unit operatively connected to the examination tool, a plurality of defect candidates from the defect map in accordance with a predefined criterion; and generating, by the processing unit, for each of the plurality of defect candidates, a respective modified inspection image patch, giving rise to a plurality of modified inspection image patches corresponding to the plurality of defect candidates, wherein the generating comprises, for a given defect candidate of the plurality of defect candidates: extracting an image patch surrounding a location of the given defect candidate respectively from the inspection image and each of the one or more reference images, giving rise to a set of image patches including an inspection image patch and one or more reference image patches corresponding to the given defect candidate; and modifying the inspection image patch to obtain a modified inspection image patch, comprising: estimating noise representative of intensity variations on the inspection image patch using the set of image patches, the noise including a first type of noise representative of a polynomial relation between pixel values of the inspection image patch and corresponding pixel values in at least some of the reference image patches, and a second type of noise representative of presence of a spatial anomaly in the inspection image patch with respect to at least some of the reference image patches, and removing at least one of the first and second types of noise from the inspection image patch based on the estimated noise; wherein the modified inspection image patches and/or the estimated noise are usable for further examination of the specimen.

This aspect of the disclosed subject matter can comprise one or more of features (i) to (ix) listed above with respect to the system, mutatis mutandis, in any desired combination or permutation which is technically possible.

In accordance with another aspect of the presently disclosed subject matter, there is provided a non-transitory computer readable storage medium tangibly embodying a program of instructions that, when executed by a computer, cause the computer to perform a method of examination of a specimen, the method comprising: capturing, by an examination tool, an inspection image of a die of the specimen and generating a defect map indicative of defect candidate distribution on the inspection image using one or more reference images; selecting, by a processing unit operatively connected to the examination tool, a plurality of defect candidates from the defect map in accordance with a predefined criterion; and generating, by the processing unit, for each of the plurality of defect candidates, a respective modified inspection image patch, giving rise to a plurality of modified inspection image patches corresponding to the plurality of defect candidates, wherein the generating comprises, for a given defect candidate of the plurality of defect candidates: extracting an image patch surrounding a location of the given defect candidate respectively from the inspection image and each of the one or more reference images, giving rise to a set of image patches including an inspection image patch and one or more reference image patches corresponding to the given defect candidate; and modifying the inspection image patch to obtain a modified inspection image patch, comprising: estimating noise representative of intensity variations on the inspection image patch using the set of image patches, the noise including a first type of noise representative of a polynomial relation between pixel values of the inspection image patch and corresponding pixel values in at least some of the reference image patches, and a second type of noise representative of presence of a spatial anomaly in the inspection image patch with respect to at least some of the reference image patches, and removing at least one of the first and second types of noise from the inspection image patch based on the estimated noise; wherein the modified inspection image patches and/or the estimated noise are usable for further examination of the specimen.

This aspect of the disclosed subject matter can comprise one or more of features (i) to (ix) listed above with respect to the system, mutatis mutandis, in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "examining", "capturing", "generating", "selecting", "extracting", "modifying", "estimating", "removing", "performing", "combining", "comparing", "determining", "providing", "calculating", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the computerized system of examination of a specimen and parts thereof as well as the processing unit therein disclosed in the present application.

The terms "non-transitory memory" and "non-transitory storage medium" used herein should be expansively construed to cover any volatile or non-volatile computer memory suitable to the presently disclosed subject matter.

The term "defect" used in this specification should be expansively construed to cover any kind of abnormality or undesirable feature or void formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
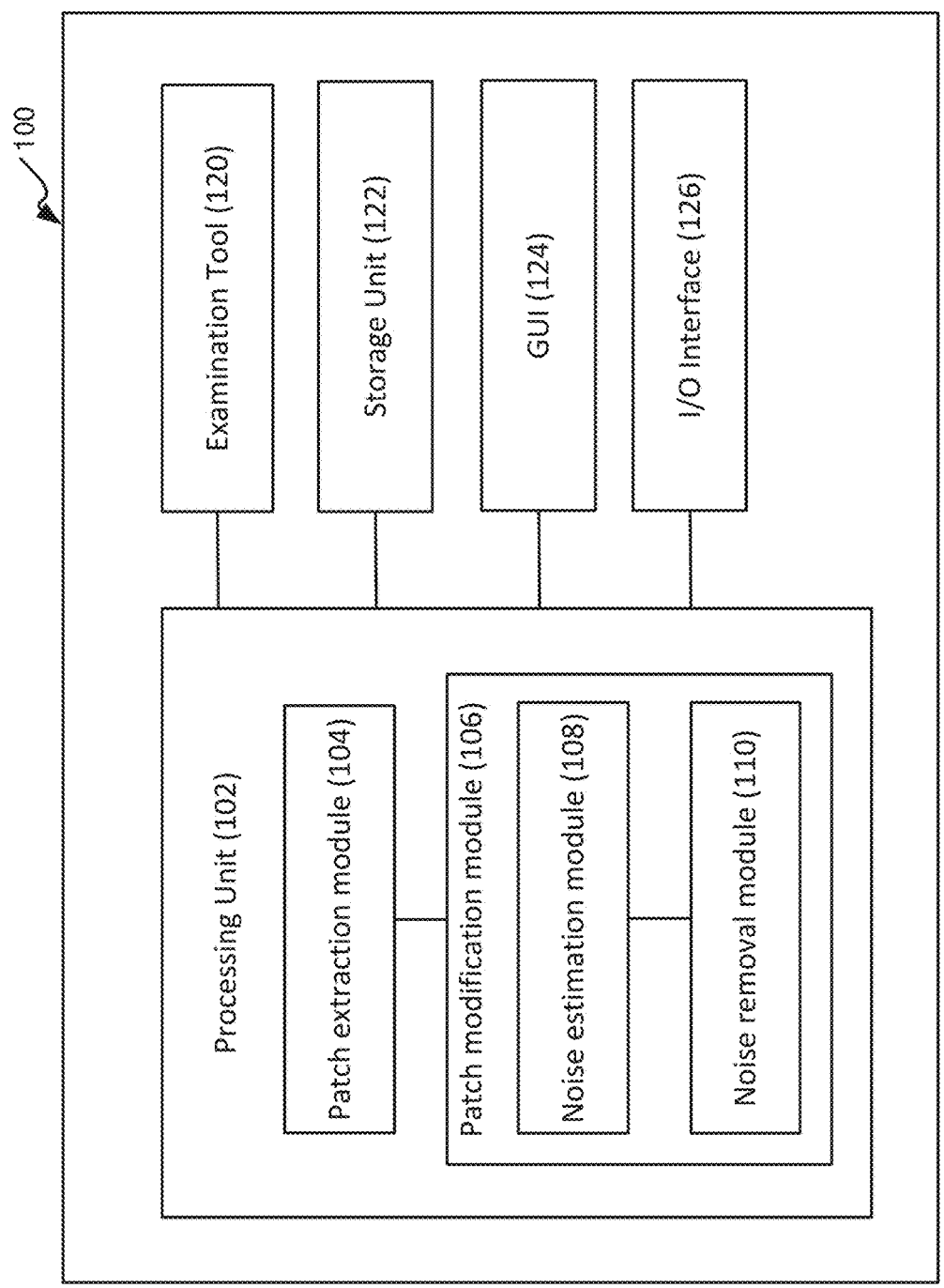
FIG. 1 illustrates a block diagram of a system of examination of a specimen in accordance with certain embodiments of the presently disclosed subject matter.

Bearing this in mind, attention is drawn to FIG. 1 illustrating a block diagram of a system of examination of a specimen in accordance with certain embodiments of the presently disclosed subject matter.

The system 100 illustrated in FIG. 1 can be used for examination of a specimen (e.g. a wafer, a die on the wafer, and/or parts thereof). As aforementioned, the term "specimen" used in this specification should be expansively construed to cover any kind of wafer, masks, reticles and other structures, combinations and/or parts thereof used for manufacturing semiconductor integrated circuits, magnetic heads, flat panel displays, and other semiconductor-fabricated articles. According to certain embodiments, the specimen used herein can be selected from a group comprising: a wafer, a reticle, a mask, an integrated circuit and a flat panel display (or at least a part thereof).

For purpose of illustration only, certain embodiments of the following description are provided with respect to die(s) and wafer(s). Embodiments are, likewise, applicable to other types, sizes and representations of specimen.

According to certain embodiments, system 100 can comprise, or be operatively connected to one or more examination tools 120. The term "examination tools" used herein should be expansively construed to cover any tools that can be used in examination-related processes including, by way of non-limiting example, imaging, scanning (in a single or in multiple scans), sampling, reviewing, measuring, classifying and/or other processes provided with regard to the specimen or parts thereof. The one or more examination tools 120 can include one or more inspection tools and/or one or more review tools. In some cases, at least one of the examination tools 120 can be an inspection tool configured to scan a specimen (e.g., an entire wafer, an entire die or portions thereof) to capture inspection images (typically, at relatively high-speed and/or low-resolution) for detection of potential defects. In some cases, at least one of the examination tools 120 can be a review tool, which is configured to capture review images of at least some of the defects detected by inspection tools for ascertaining whether a potential defect is indeed a defect. Such a review tool is usually configured to inspect fragments of a die, one at a time (typically, at relatively low-speed and/or high-resolution). Inspection tool and review tool can be different tools located at the same or at different locations, or a single tool operated in two different modes. In some cases at least one examination tool can have metrology capabilities.

Without limiting the scope of the disclosure in any way, it should also be noted that the examination tools 120 can be implemented as inspection machines of various types, such as optical imaging machines, electron beam inspection machines and so on.

According to certain embodiments, the examination tool 120 can be configured to capture an inspection image of a die of the specimen. The examination tool 120 can be further configured to generate a defect map indicative of defect candidate distribution on the inspection image using one or more reference images. The inspection image can result from different examination modality(s), and the present disclosure is not limited by the inspection and metrology technology used for generating the image. In some embodiments, the examination tool 120 can be an inspection tool configured to scan the specimen to capture the image. In some cases, the captured image of the specimen can be processed (e.g., by an image processing module whose functionality can be either integrated within the examination tool 120 or within the processing unit 102, or implemented as a standalone computer) in order to generate a defect map indicative of defect candidate distribution (i.e., suspected locations on the specimen having high probability of being a defect of interest (DOI)), as will be described in further detail with respect to FIG. 2.

The term "Defect of interest (DOI)" used herein refers to any real defects that are of the user's interest to be detected. For instance, any "killer" defects that may cause yield loss can be indicated as DOI, as in comparison to nuisance type of defects, which are also real defects, but do not impact yield, and therefore should be ignored.

The term "noise" used herein should be expansively construed to include any unwanted or not-of-interest defects (also referred to as non-DOI, or nuisance), as well as random noises that are caused by different variations (e.g., process variation, color variation, mechanical and electrical variations, etc.) during inspection.

System 100 can comprise a processing unit 102 operatively connected to the I/O interface 126 and the examination tool 120. Processing unit 102 is a processing circuitry configured to provide all processing necessary for operating system 100 which is further detailed below with reference to FIG. 2. Processing unit 102 comprises a processor (not shown separately) and a memory (not shown separately).

The processor of processing unit 102 can be configured to execute several functional modules in accordance with computer-readable instructions implemented on a non-transitory computer-readable memory comprised in the processing unit. Such functional modules are referred to hereinafter as comprised in the processing unit 102.

Functional modules comprised in the processing unit 102 can comprise a patch extraction module 104, and a patch modification module 106, which are operatively connected with each other. The patch modification module 106 can comprise a noise estimation module 108 and a noise removal module 110 operatively connected with each other. The processing unit 102 can be configured to select, in accordance with a predefined criterion, a plurality of defect candidates from the defect map; and generate, for each of the plurality of defect candidates, a respective modified inspection image patch, giving rise to a plurality of modified inspection image patches corresponding to the plurality of defect candidates.

Specifically, for a given defect candidate of the plurality of defect candidates, the patch extraction module 104 can be configured to extract an image patch surrounding the location of the given defect candidate respectively from the inspection image and each of the one or more reference images, giving rise to a set of image patches including an inspection image patch and one or more reference image patches corresponding to the given defect candidate. The patch modification module 106 can be configured to modify the inspection image patch to obtain a modified inspection image patch. According to certain embodiments, the modification of the inspection patch can be performed as follows: the noise estimation module 108 can be configured to estimate noise representative of intensity variations on the inspection image patch using the set of image patches, the noise including a first type of noise representative of a polynomial relation between at least some pixels of the inspection image patch and corresponding pixels in at least some of the reference image patches, and a second type of noise representative of presence of a spatial anomaly on the inspection image patch with respect to at least some of the reference image patches, and the noise removal module 110 can be configured to remove at least one of the first and second types of noise from the inspection image patch based on the estimated noise.

According to certain embodiments, the modified inspection image patches and/or the estimated noise can be usable for further examination of the specimen. By way of example, the modified inspection image patches can be provided to the examination tool 120 and/or any other examination tools and/or the processing unit 102 (in which case, the processing unit 102 can further comprise a defect detection module (not illustrated in FIG. 1)) to be used for performing defect detection on the specimen with respect to the one or more reference image patches, giving rise to an updated defect map. In some embodiments, the modified inspection image patches can be sent to a computer-based graphical user interface (GUI) 124 for rendering the results. By way of another example, one or more attributes characterizing the estimated noise can be provided to the examination tool 120 and/or any other examination tools and/or the processing unit 102 to be used as part of a set of attributes that characterize the defect candidates, where the set of attributes can be used for performing defect candidate clusterization, as will be described below in further detail below with reference to FIG. 2.

According to certain embodiments, system 100 can comprise a storage unit 122. The storage unit 122 can be configured to store any data necessary for operating system 100, e.g., data related to input and output of system 100, as well as intermediate processing results generated by system 100. By way of example, the storage unit 122 can be configured to store one or more images and/or derivatives thereof (e.g., defect map(s) corresponding to the image(s)) produced by the examination tool 120. Accordingly, the one or more images and/or defect maps can be retrieved from the storage unit 122 and provided to the processing unit 102 for further processing. Additionally or alternatively, the storage unit 122 can be configured to store the set of image patches, estimated noise (and attributes thereof), and/or modified inspection image patches which can be retrieved therefrom and provided to the examination tool 120 and/or any other examination tools and/or the processing unit 102 for further processing.

In some cases, system 100 can be operatively connected to one or more external data repositories (not shown in FIG. 1) which are configured to store data (and/or derivatives thereof) produced by the examination tools 120 and/or processing unit 102.

In some embodiments, system 100 can optionally comprise a computer-based Graphical User Interface (GUI) 124 which is configured to enable user-specified inputs related to system 100. For instance, the user can be presented with a visual representation of the specimen (for example, by a display forming part of GUI 124), such as, an inspection image captured for a die of the specimen and/or a corresponding defect map. The user may be provided, through the GUI, with options of defining certain operation parameters. The user may also view some processing results, such as, e.g., modified image patches and/or estimated noise, as well as other operation results, on the GUI.

It is to be noted that although it is illustrated in FIG. 1 that the examination tool 120 is implemented as a part of system 100, in certain embodiments, the functionalities of system 100 can be implemented as stand-alone computer(s) and can be operatively connected to the examination tool 120 to operate in conjunction therewith. In such cases, the defect map of the specimen can be received, either directly or via one or more intermediate systems, from the examination tool 120, and can be provided to the processing unit 102 for further processing. In some embodiments, the respective functionalities of system 100 can, at least partly, be integrated with one or more examination tools 120 thereby facilitating and enhancing the functionalities of the examination tools 120 in examination related processes. In such cases, components of the system 100, or at least part thereof, may form part of the examination tool 120. By way of one example, the patch extraction module 104, and/or the patch modification module 106, can be implemented or integrated as part of the examination tools 120. By way of another example, the processing unit 102 and storage unit 122 may form part of the processing unit and storage, respectively, of examination tool 120; and the I/O interface and GUI of the examination tool 120 may function as I/O interface 126 and GUI 124.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware.

It is noted that the system illustrated in FIG. 1 can be implemented in a distributed computing environment, in which the aforementioned functional modules shown in FIG. 1 can be distributed over several local and/or remote devices, and can be linked through a communication network. It is further noted that although the examination tool 120, storage unit 122, and GUI 124 are illustrated as being part of the system 100 in FIG. 1, in some other embodiments, at least some of the aforementioned units can be implemented as being external to system 100 and can be configured to operate in data communication with system 100 via I/O interface 126.

Figure 2:
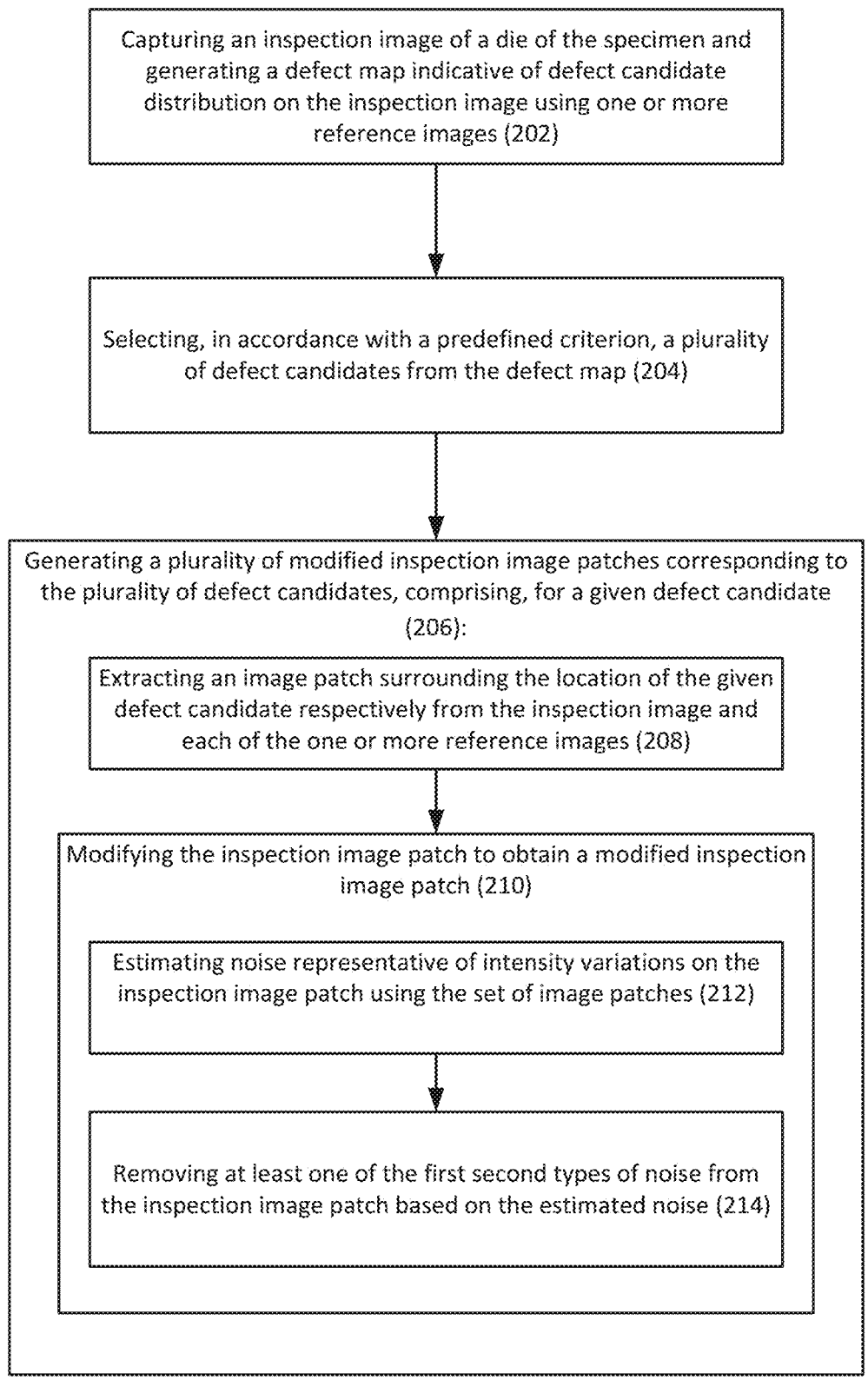
FIG. 2 illustrates a generalized flowchart of examination of a specimen in accordance with certain embodiments of the presently disclosed subject matter.

Referring now to FIG. 2, there is illustrated a generalized flowchart of examination of a specimen in accordance with certain embodiments of the presently disclosed subject matter.

An inspection image of a die of the specimen can be captured (202) (e.g., by the examination tool 120) and a defect map indicative of defect candidate distribution on the inspection image can be generated using one or more reference images. As aforementioned, the inspection image can result from different examination modality(s), and the present disclosure is not limited by the inspection and metrology technology used for generating the image. In some embodiments, the examination tool can be an optical inspection tool configured to scan the specimen to capture the inspection image.

The defect map can be generated (e.g., by a detection module and/or an image processing module whose functionality can be either integrated within the examination tool 120 or within the processing unit 102) in various ways. In some embodiments, the defect map can be generated by applying a detection threshold directly on pixel values of the captured inspection image. In some other embodiments, the inspection image can be further processed in order to generate the defect map. Different inspection and detection methodologies can be applied for processing the inspection image and generating the defect map, and the present disclosure is not limited by specific detection technologies used therein. For illustrative purposes only, there are now described a few non-limiting examples of defect detection and defect map generation based on the inspection image.

In some embodiments, for each inspection image, one or more reference images can be used for defect detection. The references images can be obtained in various ways, and the number of reference images used herein and the way of obtaining such images should not be construed to limit the present disclosure in any way. In some cases, the one or more reference images can be captured from one or more dies of the same specimen (e.g., neighboring dies of the inspection die). In some other cases, the one or more reference images can include one or more images captured from one or more dies of another specimen (e.g., a second specimen that is different from the present specimen but shares the same design data). By way of example, in Die-to-History (D2H) inspection methodology, the inspection image can be captured from a present specimen at a present time (e.g., $t=t'$), and the one or more reference images can include one or more previous images captured from one or more dies on a second specimen at a baseline time (e.g., a previous time $t=0$). In some further embodiments, the one or more reference images can include at least one simulated image representing a given die of the one or more dies. By way of example, a simulated image can be generated based on design data (e.g., CAD data) of the die.

In some embodiments, at least one difference image can be generated based on the difference between pixel values of the inspection image, and pixel values derived from the one or more reference images. Optionally, at least one grade image can also be generated based on the at least one difference image. In some cases, the grade image can be constituted by pixels with values computed based on corresponding pixel values in the difference image and a predefined difference normalization factor. The predefined difference normalization factor can be determined based on behavior of normal population of pixel values and can be used to normalize the pixel values of the difference image. By way of example, the grade of a pixel can be calculated as a ratio between a corresponding pixel value of the difference image and the predefined difference normalization factor. The defect map can be generated by determining locations of suspected defects based on the at least one difference image or the at least one grade image using a detection threshold.

In some embodiments, the generated defect map can be indicative of defect distribution comprising one or more defect characteristics of the defect candidates as revealed on the defect map by the detection process, such as, e.g., locations, strength and size of the defect candidates, etc.

A plurality of defect candidates can be selected (204) (e.g., by the processing unit 102), in accordance with a predefined criterion, from the defect map. By way of example, the predefined criterion can include that selecting a predetermined number of defect candidates having top grades (e.g., according to ranking of the grades in the grade image). By way of another example, the predefined criterion can include selecting defect candidates having grades above a selection threshold. By way of yet another example, the predefined criterion can include selecting defect candidates based on one or more predefined attributes/parameters characterizing at least some of the reference images or corresponding design data (e.g., CAD). For instance, the attributes can include a specific pattern of interest to be inspected in the image or CAD. In some cases, the predefined criterion can be a combination of one or more of the above mentioned criteria.

For each of the plurality of defect candidates, a respective modified inspection image patch can be generated (206) (e.g., by the processing unit 102), giving rise to a plurality of modified inspection image patches corresponding to the plurality of defect candidates. Specifically, for a given defect candidate of the plurality of defect candidates, the generation of a corresponding modified inspection image patch can comprise image patch extraction as will be described with reference to block 208 and image patch modification as will be described with reference to block 210 below.

Specifically, an image patch surrounding a location of the given defect candidate can be extracted (208) (e.g., by the patch extraction module 104) respectively from the inspection image and each of the one or more reference images, giving rise to a set of image patches including an inspection image patch and one or more reference image patches corresponding to the given defect candidate.

Figure 3:
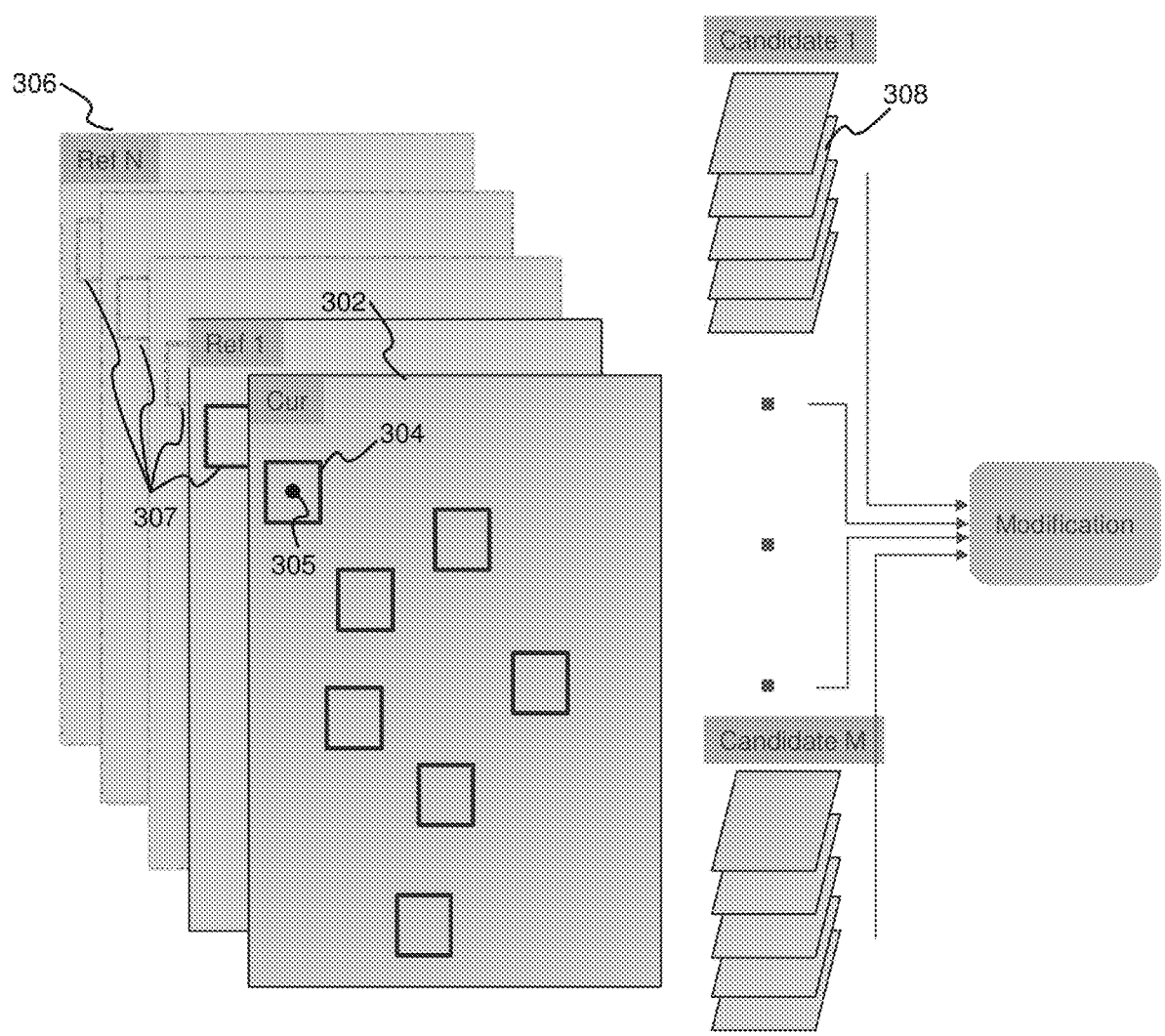
FIG. 3 illustrates a schematic illustration of image patch extraction in accordance with certain embodiments of the presently disclosed subject matter.

Referring now to FIG. 3, there is shown a schematic illustration of image patch extraction in accordance with certain embodiments of the presently disclosed subject matter.

A current inspection image 302 is captured by an examination tool. Defect detection can be performed on the inspection image 302 using one or more reference images 306 (annotated as Ref 1-Ref N), and a defect map (not shown separately in FIG. 3 for simplicity of illustration) indicative of defect candidate distribution on the inspection image 302 can be generated. A plurality of defect candidates can be selected from the defect map according to a predefined criterion. For each of the selected candidates, a surrounding image patch can be extracted respectively from the inspection image 302 and each of the reference images 306. By way of example, for defect candidate 305, an inspection image patch 304 with a square shape surrounding the defect candidate can be extracted from the inspection image 302. The inspection image patch 304 together with the corresponding one or more reference patches 307 constitute a set of image patches generated for the defect candidate 305. Thus for each of the selected defect candidates (assuming there are M selected candidates), a corresponding set of image patches 308 are generated (there are illustrated, in FIG. 3, M sets of image patches corresponding to the M selected candidates). Each set of image patches will be provided as input to the image patch modification process as will be described below with reference to block 210.

Continuing with the description of FIG. 2, the inspection image patch can be modified (210) (e.g., by the patch modification module 106) to obtain a modified inspection image patch. Specifically, noise representative of intensity variations on the inspection image patch can be estimated (212) (e.g., by the noise estimation module 108) using the set of image patches.

Intensity variation can refer to pixel intensity differences between inspection images of specimen(s), which can be caused by any type of variation including (but not limited to) process variation and color variation etc. Process variation can refer to variations caused by a change in the fabrication process of the specimen. By way of example, the fabrication process may cause thickness variation of the specimen, which affects reflectivity, thus in turn affecting gray level of the resulting inspection image. For instance, die-to-die material thickness variation can result in a different reflectivity between two of the dies, which leads to a different background gray level value for the images of the two dies. By way of another example, the fabrication process may cause slight shifting/scaling of certain structures/patterns between different inspection images which results in noise in the defect detection. Color variation can be caused by process variation and/or by inspection tool(s) used for inspecting the specimen. By way of example, changes in an inspection tool, such as different settings of the inspection tool (e.g., optical mode, detector, etc.) can cause gray level difference in different inspection images.

Certain defect attributes calculated from an inspection image and reference image(s) are therefore different due to variations of the gray level value distribution, as described above, thereby causing unstable inspection and inconsistent inspection results. In such cases, DOI may be buried within the noises, thus affecting detection sensitivity.

By effectively estimating noises representative of such intensity variations and removing/eliminating them from the inspection image/reference image(s), the present disclosed disclosure can achieve noise reduction and thus greatly improve defect detection sensitivity.

For purpose of illustration only, certain embodiments of the present disclosure are provided with respect to modification of an inspection image patch (by noise estimation and removal on the inspection image patch). Embodiments are, likewise, applicable to modification of the corresponding reference image patch(s) (by applying such noise estimation and removal on the reference image(s) in a similar manner).

According to certain embodiments of the present disclosed subject matter, the noise representative of intensity variations can be represented in two types of noise models: a first type of noise representative of a polynomial relation between pixel values of the inspection image patch and corresponding pixel values in at least some of the reference image patches, and a second type of noise representative of presence of a spatial anomaly in the inspection image patch with respect to at least some of the reference image patches. The first type of noise in general represents a systematic transformation of pixel values from one image patch to another (as represented by the polynomial relation), as will be exemplified in further detail below with reference to FIGS. 4 and 5. One example of such type of noise can be background gray level variations between the two image patches. The second type of noise in general represents a spatial shift/scaling (between the image patches) of pixel values of a group of pixels which normally constitute a spatial pattern/structure, as will be exemplified in further detail below with reference to FIG. 5.

Figure 4:
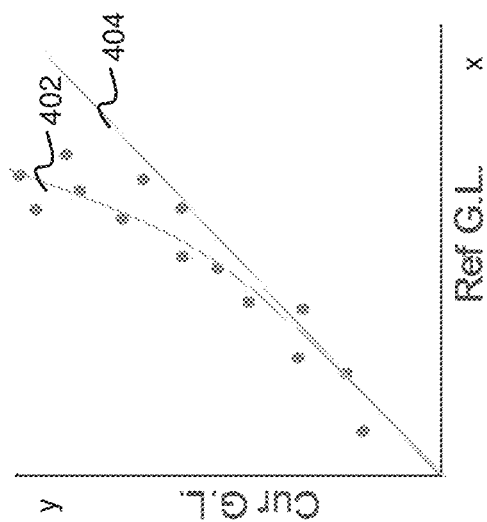
FIG. 4 illustrates a schematic graph exemplifying a polynomial relation between pixels of an inspection image patch and corresponding pixels of a reference image patch in accordance with certain embodiments of the presently disclosed subject matter.

Referring now to FIG. 4, there is illustrated a schematic graph exemplifying a polynomial relation between pixels of an inspection image patch and corresponding pixels of a reference image patch in accordance with certain embodiments of the presently disclosed subject matter.

The X axis in FIG. 4 illustrates gray levels of at least some of the pixels in the reference image patch, and the Y axis illustrates gray levels of corresponding pixels in the current inspection image patch. The inspection image patch corresponds to the reference image patch. The polynomial relation can be represented by a polynomial function in the degree of n (n=1, 2, 3 . . . ). A polynomial function can normally be expressed with variables and coefficients, such as, e.g., $y=\Sigma_{k=0}^{n} x^k a^k + b$, where x and y are variables, and the coefficients herein include $a^k$ which is also referred to as the gain or gain factor and b which is also referred to as the offset. FIG. 4 shows an example of a quadratic function 402 (i.e., polynomial of degree two) between the gray levels of the pixels in the inspection and reference image patches. It can be understood that ideally, if there is no difference/variation between the gray levels of pixel values of the inspection image patch and reference image patch, the relationship there between should be represented as a linear representation y=x as illustrated in 404. The deviation between 402 and 404 represents a polynomial shift of the pixel values which are possibly caused by process variation and/or color variation, as described above.

It is to be noted that the example shown in FIG. 4 is only for illustrative purposes and should not be deemed to limit the present disclosure in any way. Any other types/degrees of polynomial functions can be used in lieu of the above for purpose of representation of the first type of noise.

Figure 5:
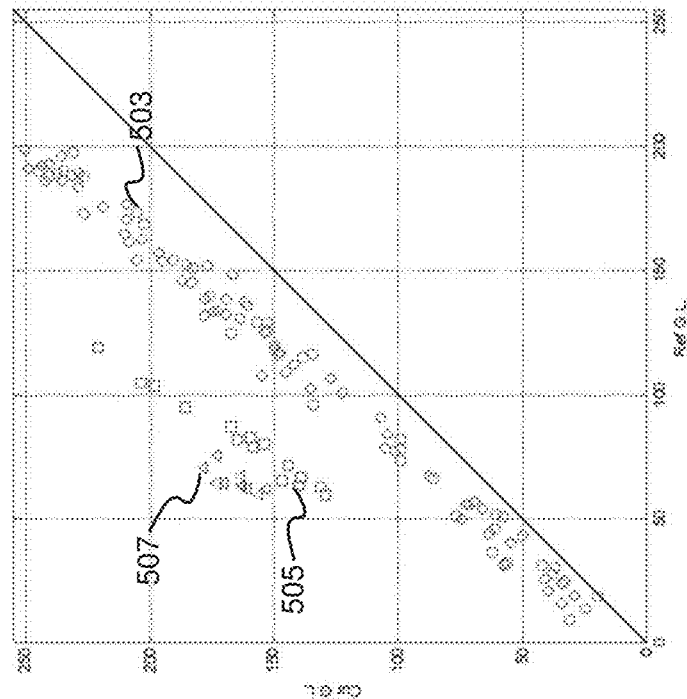
FIG. 5 illustrates schematic graphs illustrating presence of the first type of noise, the second type of noise and a defect on an inspection image patch as compared to a reference image patch in accordance with certain embodiments of the presently disclosed subject matter.
Figure 5:
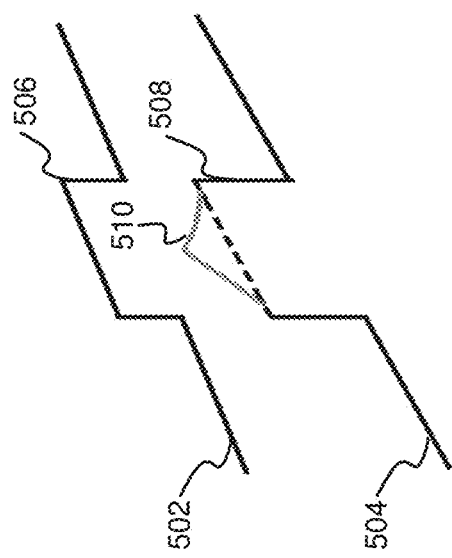

Referring now to FIG. 5, there are shown schematic graphs illustrating presence of the first type of noise, the second type of noise and a defect on an inspection image patch as compared to a reference image patch in accordance with certain embodiments of the presently disclosed subject matter.

The left graph in FIG. 5 shows pixel values (in a gradient pattern) of a reference image patch (illustrated by 502) and corresponding pixel values of an inspection image patch (illustrated by 504). There is a line struct in both image patches (illustrated as 506 in the reference image patch and 508 in the inspection image patch). In addition, there is a defect 510 located on top of the line struct 508 in the inspection image patch. For purposes of clearly illustrating the relation between the corresponding pixel values, the right graph shows the pixel values in coordinates, where the X axis illustrates gray levels of pixel values in the reference image patch, and the Y axis illustrates gray levels of corresponding pixel values in the current inspection image patch, as similarly shown in FIG. 4. It can be seen from the right graph that the pixel values in the inspection image patch are transformed from the reference image patch by a polynomial function: gain*gradient+offset (as illustrated by circles 503). In addition, there is presence of a spatial anomaly in the inspection image patch, i.e., a spatial shift of the pixels constituting the line struct in the inspection image patch as compared to the reference image patch (as illustrated by the squares 505 which deviate from the polynomial transformation 503). This can also be evident from the left graph where the pixel values of the line struct 508 in the inspection image patch are relatively higher than the pixel values of the line struct 506 in the reference image patch (besides the difference caused by the polynomial transformation). The defect which is co-positioned with the spatial anomaly on the line struct (as illustrated by the triangles 507) demonstrates further deviation on top of the spatial anomaly and the polynomial transformation.

According to certain embodiments, the noise estimation with reference to block 212 can comprise: estimating spatial size of the spatial anomaly and one or more coefficients of the polynomial relation with respect to each of the one or more reference image patches, giving rise to one or more estimations of the spatial size and the coefficients corresponding to the one or more reference image patches, and the noise removal with reference to block 214 can be performed based on at least some of the one or more estimations.

By way of example, in some cases, the estimation of spatial size for the spatial anomaly can be performed as follows: for a given reference image patch of the one or more reference image patches, providing different estimations of the spatial size, the estimation including length, width and amplitude of the spatial anomaly, and providing different defect estimations of amplitude of a potential defect co-positioned with the spatial anomaly; calculating, using a plurality of combinations between the different estimations of the spatial size and the different defect estimations, a plurality of estimated errors each indicative of a residual difference between an expected modified inspection image patch and the given reference image patch, wherein the expected modified image patch is obtainable by modifying the inspection image patch using a respective combination; and selecting a combination among the a plurality of combinations that provides a minimum estimated error among the plurality of estimated errors, the combination including a selected estimation of the spatial size.

According to certain embodiments, under the assumptions that both the spatial anomaly and the potential defect are positioned at the center of the image patch and have a respective distribution (as illustrated and described in further detail below with reference to FIG. 7), different combinations of estimations of parameters (e.g., length, width and amplitude of the spatial anomaly, and amplitude of a potential defect) can be tried out and corresponding estimated errors can be calculated. By way of example, the error can be estimated by calculating an expected modified inspection image patch according to the estimated first type of noise and second type of noise, e.g., by subtracting the estimated spatial anomaly from the inspection image patch (using the estimated length, width and amplitude) and performing the reverse of the polynomial transformation, then subtracting the reference image patch from the expected modified inspection image patch to get a residual difference, which can serve as the estimated error. In some cases, the estimated error can be the square of the residual difference (also referred to as square error in such cases). It is to be noted that the order of performing the subtraction of the estimated spatial anomaly and the reverse of the polynomial transformation, when estimating the error, does not limit the scope of the present disclosure. For instance, in some cases, the reverse of polynomial transformation can be performed first and then the subtraction of the estimated spatial anomaly is performed. From the plurality of estimated errors, the minimum estimated error can be identified and the corresponding combination of estimation can be selected. The selected combination includes an estimation of the spatial size which can be chosen as the best estimation of the spatial size for the spatial anomaly in the inspection image with respect to the given reference image patch.

In some embodiments, the one or more coefficients of the polynomial relation can be estimated together with the estimation of the spatial size for the spatial anomaly. By way of example, when calculating the estimated errors as described above, it is necessary to reverse the polynomial transformation so as to calculate the residual difference. The coefficients of the polynomial relation (e.g., the gain and offset) are thus needed for performing the calculation. Similarly, different estimations of the coefficients can be provided when performing the calculation, and the estimated coefficients that correspond to the minimum estimated error can be selected.

According to certain embodiments, once the one or more estimations (i.e., the best estimations) of the spatial size and the coefficients corresponding to the one or more reference image patches are obtained, the one or more estimations of the spatial size can be combined to generate a composite estimation of the spatial anomaly. The composite estimation can be compared with a known defect model to determine whether the composite estimation represents presence of the known defect model on the inspection image patch. In response to determination of presence of the known defect model, the second type of noise can be removed from the inspection image patch based on the composite estimation.

Figure 6:
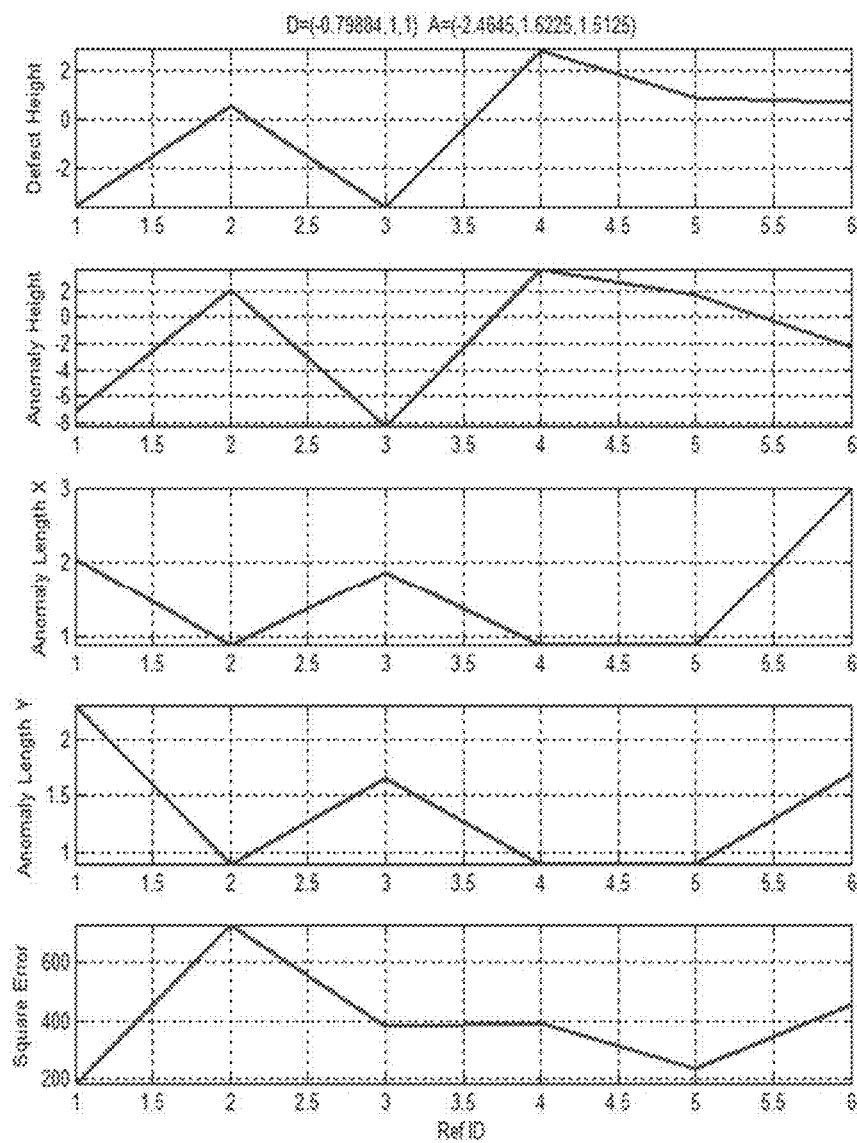
FIG. 6 illustrates schematic graphs illustrating a plurality of estimations of defect and spatial anomaly corresponding to a plurality of reference image patches in accordance with certain embodiments of the presently disclosed subject matter.

Referring now to FIG. 6, there are shown schematic graphs illustrating a plurality of estimations of defect and spatial anomaly corresponding to a plurality of reference image patches in accordance with certain embodiments of the presently disclosed subject matter.

The X axis of the graphs refers to the reference image patch number (annotated as "Ref ID", which in the present example ranges from 1 to 6). The Y axis of the graphs respectively illustrates defect amplitude (annotated as "defect height"), amplitude of spatial anomaly (annotated as "anomaly height"), length of spatial anomaly (annotated as "anomaly length X"), width of spatial anomaly (annotated as "anomaly length Y"), and estimated error (annotated as "square error"). For each reference image patch 1 to 6, the graphs show the selected best estimation of the spatial size and the defect amplitude that correspond to a minimum estimated error, according to the calculation described above. By way of example, for reference image patch 1, the best estimation comprises an amplitude of defect at −4 (e.g., a defect having an negative amplitude may indicate it is a dent), an amplitude of the spatial anomaly at −7, size of spatial anomaly at 2*2.5, and the minimum estimated error corresponding to the best estimation is 200, which is the smallest estimated error among the six references. By way of another example, for reference image patch 2, the best estimation comprises an amplitude of defect at 0.5, an amplitude of the spatial anomaly at 2, size of spatial anomaly at 0.9*0.9, and the minimum estimated error corresponding to the best estimation is 700, which is the largest estimated error among the six references.

The six best estimations corresponding to six reference image patches can be combined to generate a composite estimation. For instance, the estimations of the spatial size can be averaged, or weighted averaged, where the weight applied on each estimation is related to the estimated error corresponding thereto, e.g., a reciprocal of the estimated error. The composite estimation can be compared with a known defect model to determine whether the composite estimation represents presence of the known defect model on the inspection image patch.

Figure 7:
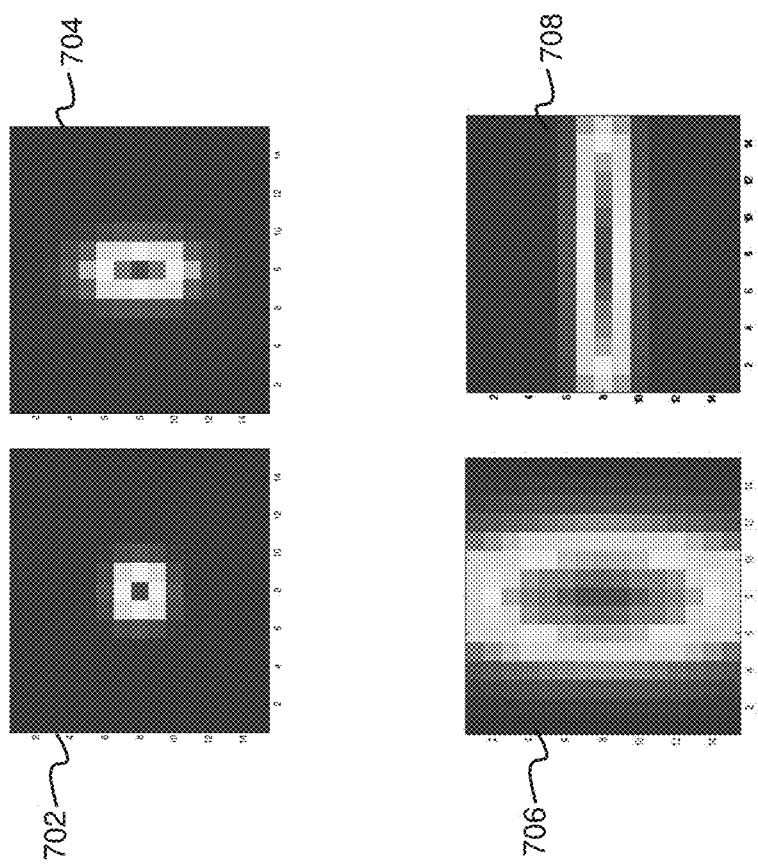
FIG. 7 shows exemplary illustrations of pixel distribution of known defect models and spatial anomalies in accordance with certain embodiments of the presently disclosed subject matter.

Referring now to FIG. 7, there are shown exemplary illustrations of pixel distribution of known defect models and spatial anomalies in accordance with certain embodiments of the presently disclosed subject matter.

As shown, the graphs 702 and 704 illustrate two pixel distributions of known defect models. The exemplified defect models have a shape of a point-spread function with a fixed size, which is known a priori since it can be normally related to specifics of the inspection tools, such as, e.g., the optics thereof. For instance, graph 702 shows an exemplary pixel value distribution in a size of 3-pixel by 3-pixel (or 5-pixel by 5-pixel). There is illustrated a gradual change of pixel values from the center pixel to the pixels adjacent thereto. Graph 704 shows a similar distribution with a different size. In comparison, graphs 706 and 708 illustrate two pixel distributions of spatial anomalies. The exemplified spatial anomalies have a Gaussian shape with unknown amplitudes and sizes. As shown, the sizes of spatial anomaly are relatively larger than the defect model at least in certain dimensions. By way of example, assuming an composite estimation of a spatial anomaly has an amplitude of 20 and a size of 13*4, whereas the defect model is set to have an amplitude between 10-100, and a size of 3*3, by comparison there between, it can be determined that there is presence of spatial anomaly but not a defect due to the abnormal size indicated by the estimation. In such cases, the spatial anomaly can be removed from the inspection image patch based on the estimated spatial size thereof.

According to certain embodiments, the one or more estimations of the coefficients can be combined to generate a composite estimation of the polynomial relation. In such cases, the noise removal can be performed by removing the first type of noise from the inspection image patch based on the composite estimation of the polynomial relation.

It is to be noted that in some cases the noise removal can include only removal of the first type of noise or the second type of noise, while in some other cases, the noise removal can include removal of both types of noises. The present disclosure is not limited by a specific implementation thereof.

Once noise estimation and noise removal is performed on the inspection image patch corresponding to a given defect candidate, a modified inspection image patch is generated. Therefore, for the plurality of defect candidates, a plurality of corresponding modified inspection image patches can be generated. In some embodiments, the plurality of modified inspection image patches and/or the estimated noise as obtained during the noise estimation process can be used for further examination of the specimen.

By way of example, defect detection can be performed on the specimen using the plurality of modified inspection image patches with respect to the one or more reference image patches, giving rise to an updated defect map. Considering a previous defect detection was already performed and a previous defect map was generated as described above with reference to block 202, the updated defect detection can also be referred to as defect re-detection. By way of example, in some cases, the modified inspection image patches can be used to form, together with the unmodified part of the inspection image, an updated inspection image.

The defect re-detection can be performed on the updated inspection image using one or more reference images. By way of another example, the defect re-detection process can start from processing the modified inspection image patches so as to generate updated difference image patches and updated grade image patches. The updated grade image patches can then be used to form an updated grade image together with the un-updated part from a previous grade image. The detection threshold can be applied on the updated grade image so as to generate the updated defect map with new defect candidates.

As aforementioned, since the present disclosure can effectively remove noise representative of the intensity variations from the inspection image, defect re-detection performed using the modified inspection image can greatly improve defect detection sensitivity and more DOIs can be revealed.

Figure 8:
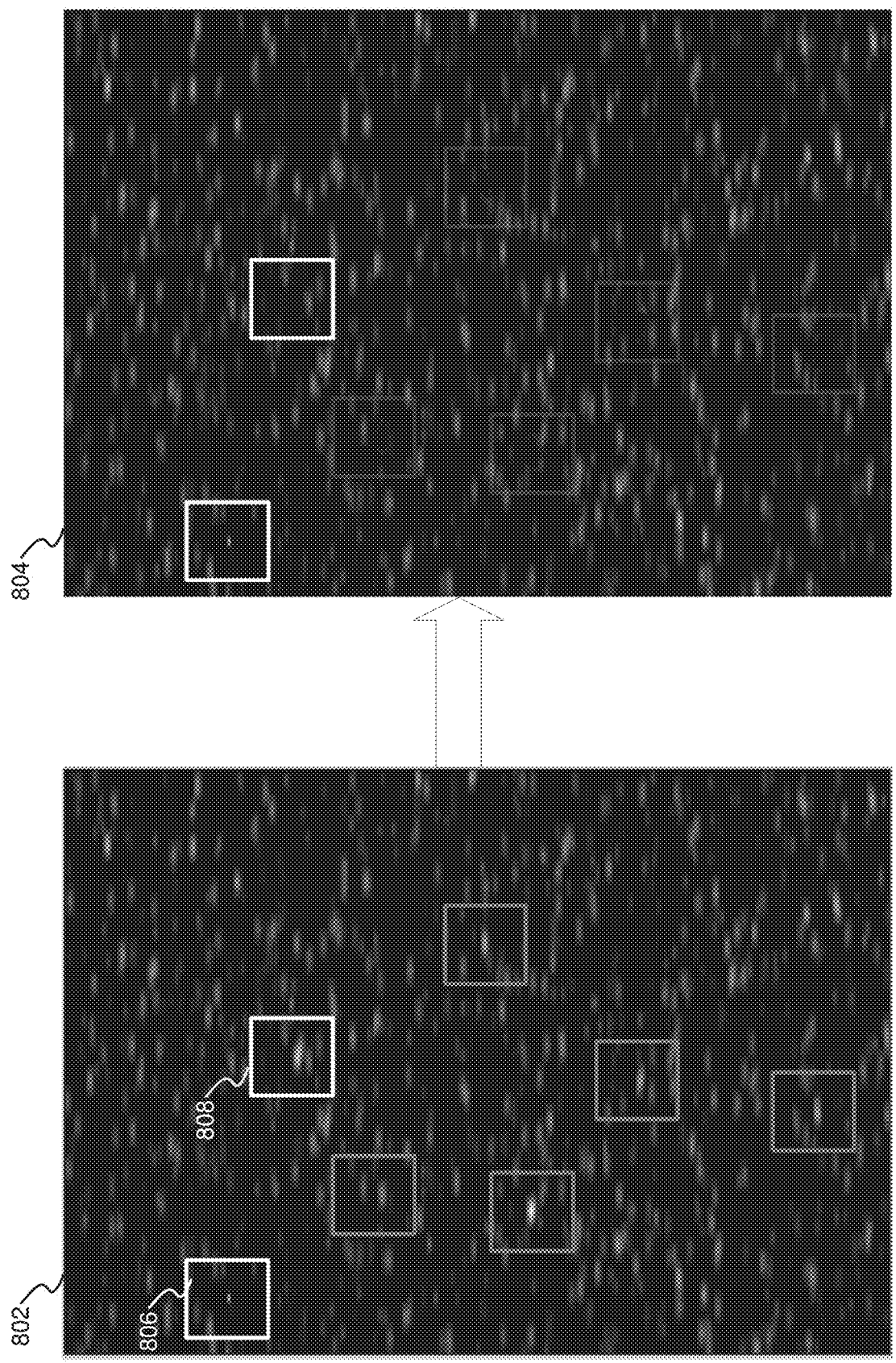
FIG. 8 illustrates an example of a defect map generated before defect re-detection and a corresponding updated defect map generated after the re-detection in accordance with certain embodiments of the presently disclosed subject matter.

Referring now to FIG. 8, there is illustrated an example of a defect map generated before defect re-detection and a corresponding updated defect map generated after the re-detection in accordance with certain embodiments of the presently disclosed subject matter.

As shown, there is illustrated a defect map 802 generated based on a grade image before applying the noise removal and defect re-detection. The defect candidates are selected and marked with squares, among which 806 is a DOI and the rest are false alarms including a false alarm 808. It can be seen that the false alarm 808 (among others) has a very strong signal strength as compared to the DOI 806, and the defect map appears very noisy. Thus it is possible that in some cases, the DOI may be buried in the noises and some of the false alarms may be detected instead. After applying the noise removal in the inspection image and defect re-detection, as described above, an updated defect map 804 is generated, in which some of the false alarms are removed (such as the false alarm 808) and some have a weaker signal strength, while the DOI 806 remains with the same signal strength. The updated defect maps 804 is relatively quieter (with a higher Signal-Noise Ratio (SNR)) as compared with the defect map 802, thus making it easier to detect the DOI 806 (i.e., higher detection sensitivity).

Figure 9:
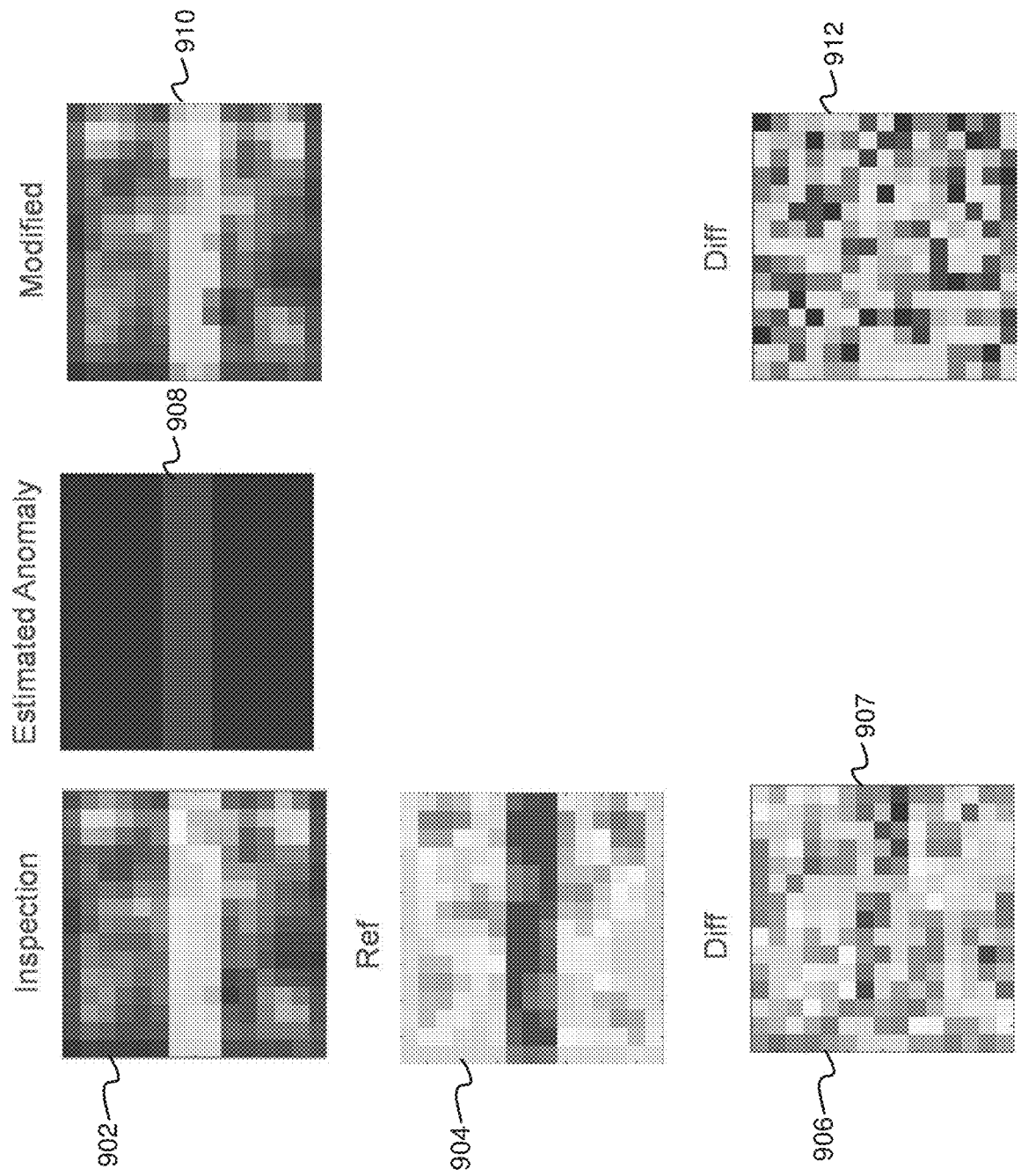
FIG. 9 illustrates an exemplary modification of the inspection image patch corresponding to the false alarm 808 in FIG. 8 in accordance with certain embodiments of the presently disclosed subject matter.

Referring now to FIG. 9, there is illustrated an exemplary modification of the inspection image patch corresponding to the false alarm 808 in FIG. 8 in accordance with certain embodiments of the presently disclosed subject matter.

As shown, there is illustrated an inspection image patch 902 which corresponds to the false alarm 808, a reference image patch 904, and a difference image patch 906 generated based on the inspection and reference image patches 902 and 904. The difference image patch 906 illustrates a possible false alarm 907 which corresponds to a spatial structure, e.g., a line struct in the specimen. This can be caused due to the gray level difference in the inspection and reference image patches, especially the difference in the position of the line struct. By applying the noise estimation as described above, it is detected that there is a presence of a spatial anomaly 908 at the position of the line struct in the inspection image patch 902. Upon removing the spatial anomaly from the inspection image patch, a modified inspection image patch 910 is obtained. Per defect re-detection using the modified inspection image patch, an updated difference image patch 912 is generated, from which it can be seen that the false alarm 907 as previously appeared, has been removed.

According to some embodiments, the estimated noise can serve as one or more attributes which can be used, together with other attributes that characterize the defect candidates, to perform defect candidate clusterization or clustering. By way of example, the one or more attributes of the estimated noise can comprise the one or more estimations of the spatial size and the coefficients. Defect clusterization used herein refers to grouping the defect candidates (as revealed in the defect map) in attribute space based on a set of attributes that characterize the defect candidates, such that the defect candidates in the same group (cluster) are more similar to each other than to those in other clusters. This can be used for detecting anomalies/outliers that do not conform with the majority population, which are more likely to be DOIs. In some embodiments, the clusterization can be implemented using machine learning.

It is to be noted that in some cases, the present disclosure can be used for defect re-detection (e.g., using the modified inspection image patches), or in some other cases, used for defect candidate clusterization (e.g., using the estimate noise). In some further cases, both defect re-detection and defect candidate clusterization can be performed in order to further improve the detection result. By way of example, defect re-detection can be performed to get an updated defect map with new defect candidates, and defect candidate clusterization can be performed on the new candidates, thus improving the accuracy and sensitivity of the detection.

It is also noted that whilst the flow charts illustrated in FIG. 2 are described with reference to elements of system 100, this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable storage medium tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized system of examination of a specimen, the system comprising:
    an examination tool configured to capture an inspection image of a die of the specimen and generate a defect map indicative of defect candidate distribution on the inspection image using one or more reference images; and
    a processing unit operatively connected to the examination tool, the processing unit comprising a memory and a processor operatively coupled thereto, the processing unit configured to:

select, in accordance with a predefined criterion, a plurality of defect candidates from the defect map; and generate, for each of the plurality of defect candidates, a respective modified inspection image patch, giving rise to a plurality of modified inspection image patches corresponding to the plurality of defect candidates, wherein the generating comprises, for a given defect candidate of the plurality of defect candidates:

extracting an image patch surrounding a location of the given defect candidate respectively from the inspection image and each of the one or more reference images, giving rise to a set of image patches including an inspection image patch and one or more reference image patches corresponding to the given defect candidate; and modifying the inspection image patch to obtain a modified inspection image patch, comprising: estimating noise representative of intensity variations on the inspection image patch using the set of image patches, the noise including a first type of noise representative of a polynomial relation between pixel values of the inspection image patch and corresponding pixel values in at least some of the reference image patches, and a second type of noise representative of presence of a spatial anomaly in the inspection image patch with respect to at least some of the reference image patches, and removing at least one of the first and second types of noise from the inspection image patch based on the estimated noise;

wherein the modified inspection image patches and/or the estimated noise are usable for further examination of the specimen.

2. The computerized system according to claim 1, wherein the processing unit is further configured to perform defect detection on the specimen using the plurality of modified inspection image patches with respect to the one or more reference image patches, giving rise to an updated defect map.

3. The computerized system according to claim 1, wherein the processing unit is further configured to perform defect candidate clusterization using a set of attributes characterizing the defect candidates, the set of attributes comprising at least one or more attributes of the estimated noise.

4. The computerized system according to claim 1, wherein the estimating comprises: estimating a spatial size of the spatial anomaly and one or more coefficients of the polynomial relation with respect to each of the one or more reference image patches, giving rise to one or more estimations of the spatial size and the coefficients corresponding to the one or more reference image patches, and performing the removing based on at least some of the one or more estimations.

5. The computerized system according to claim 4, wherein the estimating further comprises: combining the one or more estimations of the spatial size to generate a composite estimation of the spatial anomaly, comparing the composite estimation with a known defect model to determine whether the composite estimation represents presence of the known defect model on the inspection image patch, and wherein the removing comprises in response to determination of presence of the known defect model, removing the second type of noise from the inspection image patch based on the composite estimation.

6. The computerized system according to claim 4, wherein the estimating further comprises combining the one or more estimations of the coefficients to generate a composite estimation of the polynomial relation, and wherein the removing comprises removing the first type of noise from the inspection image patch based on the composite estimation.

7. The computerized system according to claim 5, wherein the estimating further comprises combining the one or more estimations of the coefficients to generate a composite estimation of the polynomial relation, and wherein the removing further comprises removing the first type of noise from the inspection image patch based on the composite estimation of the polynomial relation.

8. The computerized system according to claim 4, wherein the estimating of the spatial size comprises, for a given reference image patch of the one or more reference image patches:

providing different estimations of the spatial size each including length, width and amplitude of the spatial anomaly, and different defect estimations of amplitude of a potential defect co-positioned with the spatial anomaly;

calculating, using a plurality of combinations between the different estimations of the spatial size and the different defect estimations, a plurality of estimated errors each indicative of a residual difference between an expected modified inspection image patch and the given reference image patch, wherein the expected modified image patch is obtainable by modifying the inspection image patch using a respective combination; and selecting a combination among the plurality of combinations that provides a minimum estimated error among the plurality of estimated errors, wherein the selected combination includes a selected estimation of the spatial size.

9. The computerized system according to claim 4, wherein the one or more coefficients comprise gain and offset of the polynomial relation.

10. The computerized system according to claim 3, wherein the one or more attributes of the estimated noise comprise one or more estimations of the spatial size and the coefficients.

11. The computerized system according to claim 1, wherein the examination tool is an optical inspection tool.

12. A computerized method of examination of a specimen, the method comprising:

capturing, by an examination tool, an inspection image of a die of the specimen and generating a defect map indicative of defect candidate distribution on the inspection image using one or more reference images;

selecting, by a processing unit operatively connected to the examination tool, a plurality of defect candidates from the defect map in accordance with a predefined criterion; and generating, by the processing unit, for each of the plurality of defect candidates, a respective modified inspection image patch, giving rise to a plurality of modified inspection image patches corresponding to the plurality of defect candidates, wherein the generating comprises, for a given defect candidate of the plurality of defect candidates:

extracting an image patch surrounding a location of the given defect candidate respectively from the inspection image and each of the one or more reference images, giving rise to a set of image patches including an inspection image patch and one or more reference image patches corresponding to the given defect candidate; and modifying the inspection image patch to obtain a modified inspection image patch, comprising: estimating noise representative of intensity variations on the inspection image patch using the set of image patches, the noise including a first type of noise representative of a polynomial relation between pixel values of the inspection image patch and corresponding pixel values in at least some of the reference image patches, and a second type of noise representative of presence of a spatial anomaly in the inspection image patch with respect to at least some of the reference image patches, and removing at least one of the first and second types of noise from the inspection image patch based on the estimated noise;

wherein the modified inspection image patches and/or the estimated noise are usable for further examination of the specimen.

13. The computerized method according to claim 12, further comprising performing defect detection on the specimen using the plurality of modified inspection image patches with respect to the one or more reference image patches, giving rise to an updated defect map.

14. The computerized method according to claim 12, further comprising performing defect candidate clusterization using a set of attributes characterizing the defect candidates, the set of attributes comprising at least one or more attributes of the estimated noise.

15. The computerized method according to claim 12, wherein the estimating comprises: estimating a spatial size of the spatial anomaly and one or more coefficients of the polynomial relation with respect to each of the one or more reference image patches, giving rise to one or more estimations of the spatial size and the coefficients corresponding to the one or more reference image patches, and performing the removing based on at least some of the one or more estimations.

16. The computerized method according to claim 15, wherein the estimating further comprises: combining the one or more estimations of the spatial size to generate a composite estimation of the spatial anomaly, comparing the composite estimation with a known defect model to determine whether the composite estimation represents presence of the known defect model on the inspection image patch, and wherein the removing comprises in response to determination of presence of the known defect model, removing the second type of noise from the inspection image patch based on the composite estimation.

17. The computerized method according to claim 15, wherein the estimating further comprises combining the one or more estimations of the coefficients to generate a composite estimation of the polynomial relation, and wherein the removing comprises removing the first type of noise from the inspection image patch based on the composite estimation.

18. The computerized method according to claim 16, wherein the estimating further comprises combining the one or more estimations of the coefficients to generate a composite estimation of the polynomial relation, and wherein the removing further comprises removing the first type of noise from the inspection image patch based on the composite estimation of the polynomial relation.

19. The computerized method according to claim 15, wherein the estimating of the spatial size comprises, for a given reference image patch of the one or more reference image patches:

providing different estimations of the spatial size each including length, width and amplitude of the spatial anomaly, and different defect estimations of amplitude of a potential defect co-positioned with the spatial anomaly;

calculating, using a plurality of combinations between the different estimations of the spatial size and the different defect estimations, a plurality of estimated errors each indicative of a residual difference between an expected modified inspection image patch and the given reference image patch, wherein the expected modified image patch is obtainable by modifying the inspection image patch using a respective combination; and selecting a combination among the plurality of combinations that provides a minimum estimated error among the plurality of estimated errors, wherein the selected combination includes a selected estimation of the spatial size.

20. A non-transitory computer readable storage medium tangibly embodying a program of instructions that, when executed by a computer, causing the computer to perform a method of examination of a specimen, the method comprising:

obtaining an inspection image of a die of the specimen and generating a defect map indicative of defect candidate distribution on the inspection image using one or more reference images;

selecting a plurality of defect candidates from the defect map in accordance with a predefined criterion; and generating for each of the plurality of defect candidates, a respective modified inspection image patch, giving rise to a plurality of modified inspection image patches corresponding to the plurality of defect candidates, wherein the generating comprises, for a given defect candidate of the plurality of defect candidates:

extracting an image patch surrounding a location of the given defect candidate respectively from the inspection image and each of the one or more reference images, giving rise to a set of image patches including an inspection image patch and one or more reference image patches corresponding to the given defect candidate; and modifying the inspection image patch to obtain a modified inspection image patch, comprising: estimating noise representative of intensity variations on the inspection image patch using the set of image patches, the noise including a first type of noise representative of a polynomial relation between pixel values of the inspection image patch and corresponding pixel values in at least some of the reference image patches, and a second type of noise representative of presence of a spatial anomaly in the inspection image patch with respect to at least some of the reference image patches, and removing at least one of the first and second types of noise from the inspection image patch based on the estimated noise;

wherein the modified inspection image patches and/or the estimated noise are usable for further examination of the specimen.

* * * * *